(12) United States Patent
Jung et al.

(10) Patent No.: US 7,756,387 B2
(45) Date of Patent: Jul. 13, 2010

(54) INFORMATION STORAGE MEDIUM CONTAINING PRELOADING INFORMATION, APPARATUS AND METHOD OF REPRODUCING THE SAME

(75) Inventors: Kil-soo Jung, Gyeonggi-do (KR); Sung-wook Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1583 days.

(21) Appl. No.: 10/918,399

(22) Filed: Aug. 16, 2004

(65) Prior Publication Data
US 2005/0074227 A1 Apr. 7, 2005

(30) Foreign Application Priority Data
Oct. 10, 2003 (KR) ............ 10-2003-0070750
Apr. 2, 2004 (KR) ............ 10-2004-0022880

(51) Int. Cl.
*H04N 5/91* (2006.01)
*H04N 5/00* (2006.01)

(52) U.S. Cl. .................... 386/46; 386/125
(58) Field of Classification Search ............ 386/49, 386/95, 114, 124–126
See application file for complete search history.

(56) References Cited

U.S. PATENT DOCUMENTS 6,459,851 B1* 10/2002 Sonu .................... 386/116
2003/0215224 A1* 11/2003 Yoo et al. ............. 386/125

FOREIGN PATENT DOCUMENTS

EP 1267352 * 12/2002

* cited by examiner

*Primary Examiner*—Thai Tran
*Assistant Examiner*—Mishawn Dunn
(74) *Attorney, Agent, or Firm*—NSIP Law

(57) ABSTRACT

An information storage medium having preload information and an apparatus and a method of reproducing the same, and more particularly, an information storage medium storing contents and preloading information in a binary format and an apparatus and method of reproducing the same. The information storage medium includes: navigation data for AV data; at least AV data which is decoded to an AV data stream with reference to the navigation data and is recorded with a format of a clip as a recording and reproducing unit; and preloading information which reads data to be preloaded corresponding to the AV data and commands the data to be stored in a buffer.

16 Claims, 5 Drawing Sheets

FIG. 4

```
                          Pre-loading Table
Preload() {
   length
   FirstPlayback(){
      number_of_resources
      for(resource_number=0; resource_number<number_of_resources; resource_number++){
         Resource[resource_number](){
            URI
            data_size
            data_type
            ......
         }
      }
   }
   Top Menu(){
      number_of_resources
      for(resource_number=0; resource_number<number_of_resources; resource_number++){
         Resource[resource_number](){
            URI
            data_size
            data_type
            ......
         }
      }
   }
   number_of_Titles
   for(title_number=0; title_number<number_of_Titles; title_number++){
      Title[title_number](){
         number_of_resources
         for(resource_number=0; resource_number<number_of_resources;
         resource_number++) {
            Resource[resource_number](){
               URI
               data_size
               data_type
               ......
            }
         }
      }
   }
}
```

INFORMATION STORAGE MEDIUM CONTAINING PRELOADING INFORMATION, APPARATUS AND METHOD OF REPRODUCING THE SAME

CROSS-REFERENCE TO RELATED APPLICATIONS

This application claims the priorities of Korean Patent Application No. 2003-70750, filed on Oct. 10, 200 and 2004-22880, filed on Apr. 2, 2004, in the Korean Intellectual Property Office, and U.S. provisional Patent Application No. 60/508,314, filed on Oct. 6, 2003, in the U.S. Patents and Trademark Office, disclosures of which are incorporated herein by reference.

BACKGROUND OF THE INVENTION

1. Field of the Invention

The present invention relates to an information storage medium having preloading information and an apparatus and method of reproducing the same, and more particularly, to an information storage medium storing contents and preloading information in a binary format and an apparatus and method of reproducing the same.

2. Description of the Related Art

Generally, moving-image data is classified into audio-video (AV) data for a high definition movie and navigation data for controlling reproduction of the AV data. Demand is increasing for applications with a programming function for reinforcing interaction with a user. However, to provide this function, a pick-up device should move frequently to read data for a programming function and a browsing function while reproducing AV data. Therefore, seamless reproduction is not guaranteed.

SUMMARY OF THE INVENTION

The present invention provides an information storage medium having preloading information, capable of providing various program functions and browsing functions while seamlessly reproducing moving images, and an apparatus and method of reproducing the same.

According to an aspect of the invention, there is provided an information storage medium including: navigation data for AV data; at least AV data which is decoded to an AV data stream with reference to the navigation data and is recorded with a format of a clip as a recording and reproducing unit; and preloading information that reads data to be preloaded corresponding to the AV data and commands the data to be stored in a buffer.

The preloading information stores location information of the data to be preloaded in a format of binary data.

The preloading information is divided into title units, each title unit corresponding to a reproduction mode.

The preloading information further includes size information and/or type information of the data to be preloaded.

According to another aspect of the invention, there is provided an apparatus for reproducing AV data recorded in an information storage medium, the apparatus including: a reader that reads AV data and preloading information; a buffer that stores received AV data and/or preloading information; a decoder that decodes the AV data stored in the buffer; and a buffer manager that controls the buffer with reference to the preloading information so that data to be preloaded is stored in advance in the buffer before the AV data is reproduced.

According to another aspect of the invention, there is provided a method of reproducing AV data recorded in an information storage medium, the method including: reading the AV data and/or preloading information; interpreting the preloading information, reading data to be preloaded corresponding to the AV data based on the preloading information, and storing the read data in a buffer; and decoding preloaded object data according to reproduction time information included in the preloading information.

According to still yet another aspect of the present invention, there is provided a computer-readable medium having embodied thereon a computer program for executing the method.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which:

FIG. 4 shows preloading data syntax according to an aspect of the invention.

DETAILED DESCRIPTION OF THE PREFERRED EMBODIMENTS

Figure 1:
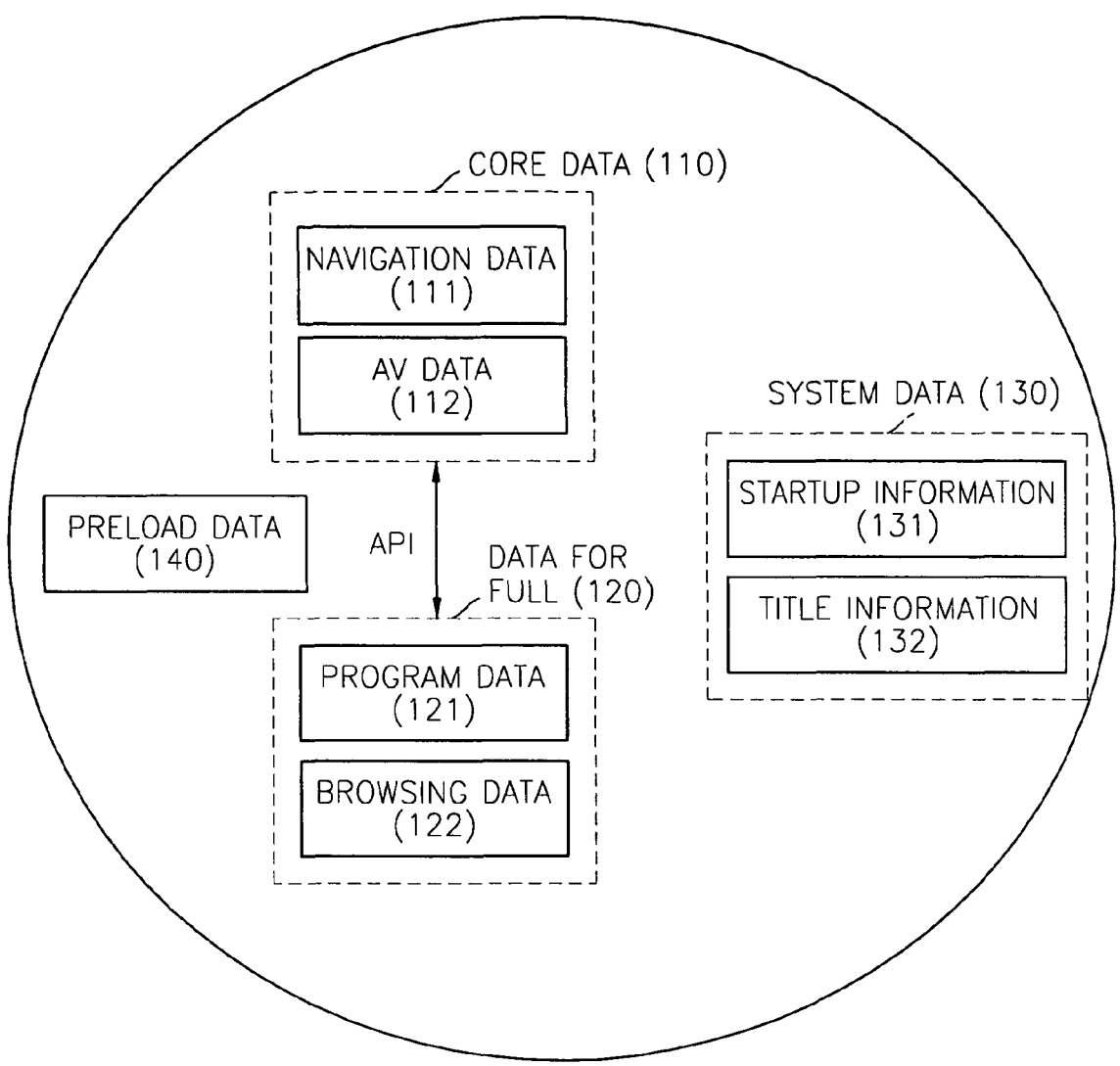
FIG. 1 shows data types to be stored in an information storage medium according to an aspect of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 shows data types to be stored in an information storage medium according to an aspect of the invention. Referring to FIG. 1, core data 110 includes AV data 111 and navigation data 112. The navigation data 112 is a collection of navigation commands for reproducing AV data. The core data is also called core mode data. The core data 110 is data that is used in a video application such as DVD, and is required for displaying a movie. For example, a mode that reproduces such core data 110 is called a film mode.

Also, data for reinforcing various interactions with a user are generally known as 'Data for Full' 120. For example, the Data for Full 120 is also called a data for full mode. The data for full mode includes program data 121 for providing various interactions with a user and browsing data 122 for allowing Internet browsing. The program data 121 is, for example, a java application that provides various functions for interactions with the user. The browsing data 122 includes markup documents written with a markup language such as XML, markup documents including or linking script codes such as ECMA script, script files, at least one image referenced by markup documents, and resource files such as graphics and sounds. The core data 110 can communicate with the data for full 120 through application program interface (API). The API can be implemented by a java API. It is understood by those of skill in the art that the API can be implemented by a variety of programs.

System data 130 includes startup information 131 and title information 132. The system data 130 is data to be first read when the information storage medium is booted, inserted, or by command of a user, as data being used without belonging to a specific mode.

Preloading data 140 is binary data that designates various resources to be preloaded in a data buffer for full mode in order to guarantee seemless reproduction of AV data, when the AV data is reproduced using the data for full mode.

Storing information in a format of binary data is not recording information in a text-based format, but instead storing information while providing meanings to each of predetermined bytes for binary data. For example, information is stored in a manner that first predetermined bytes correspond to a storage space of resource data, the following predetermined bytes correspond to the size of the resource data, and the following predetermined bytes correspond to the types of the resource data. The detailed data format thereof is described below with reference to FIG. 4.

Figure 2A:
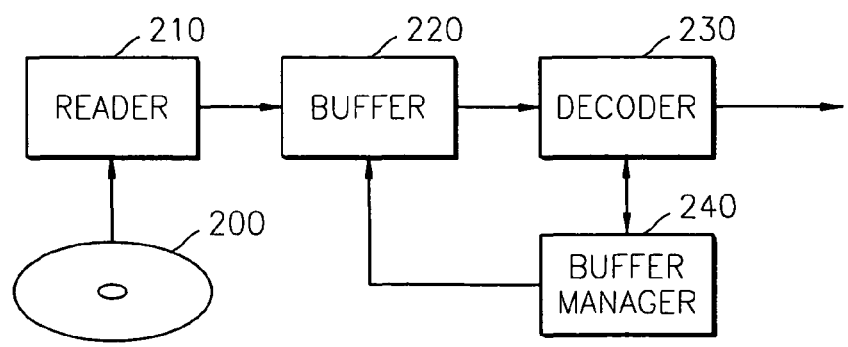
FIG. 2A is a block diagram of a reproduction apparatus according to an aspect of the invention.

FIG. 2A is a block diagram of a reproduction apparatus according to an aspect of the invention. Referring to FIG. 2A, the reproduction apparatus reproduces AV data in a core mode or in a full mode, using core data 110 and/or data for full 120 recorded on a disc 200. The reproduction apparatus includes a reader 210, a buffer 220, a decoder 230, and a buffer manager 240. The reader 210 reads desired data from the disc 200. The buffer 220 buffers data read by the reader 210 and the decoder 230 decodes and outputs the buffered data. Data read by the reader 210 and stored in the buffer 220 may include preloading data. The buffer manager 240 controls the buffer 220 and the decoder 230 with reference to the preloading data so that a required resource file can be pre-stored in the buffer before the data for full is reproduced.

Figure 2B:
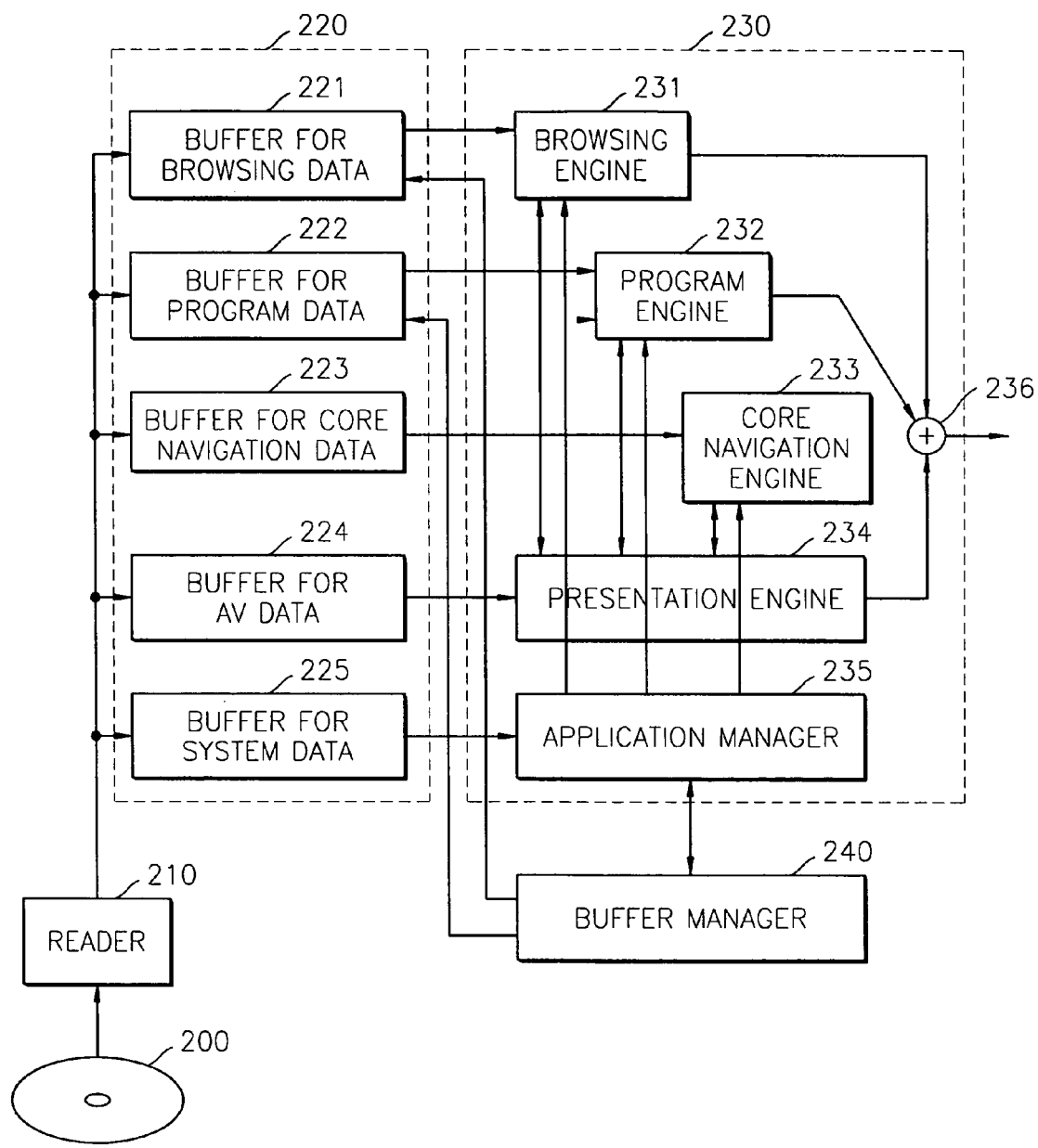
FIG. 2B is a detailed block diagram of the reproduction apparatus shown in FIG. 2A.

FIG. 2B is a detailed block diagram of the reproduction apparatus shown in FIG. 2A. Referring to FIG. 2B, the reproduction apparatus displays AV data recorded on an information storage medium, using data for core mode, data for browser mode, or data for program mode, according to a display method.

The buffer 220 includes multiple buffer areas. For example, in FIG. 2B, the buffer 200 includes a buffer 221 for browsing data, a buffer 222 for program data, a buffer 223 for navigation data buffer 223, a buffer 224 for AV data, and a buffer 225 for system data. The decoder 230 includes a browsing engine 231, a program engine 231, a core navigation engine 223, a presentation engine 234, an application manager 235, and a blender 236.

The reader 210 reads multiple types of data, for example, in FIG. 2B, the reader reads AV data, browsing data, program data, core navigation data, system data, and preloading data from the information storage medium 200, and buffers them in the respective buffers for the respective data so that the respective engines can reproduce them. In FIG. 2B, the preloading data is buffered in the system data buffer 255 and then transferred to the application manger 235. If, for example, a title for full mode is selected according to the system data, preloading data corresponding to the corresponding title is transmitted to the buffer manager. The buffer manager 240 controls so that a data buffer for corresponding mode can read required resource files with reference to the preloading data before the data for full mode is reproduced.

The application manager 235 further includes a user input receiving unit and a user input processing unit for processing a user input and transmits a user input to an engine for corresponding mode. The presentation engine 234 decodes and reproduces moving-images and/or still-image streams and/or data files. The browser engine 231 and the program engine 232 control the presentation engine 234 through API (Application Program Interface), like the core navigation engine 233. The API may be Java API. Hereinafter, referring to FIG. 3, a process of reproducing the program data and browsing data using the preloading data is described in detail.

Figure 3:
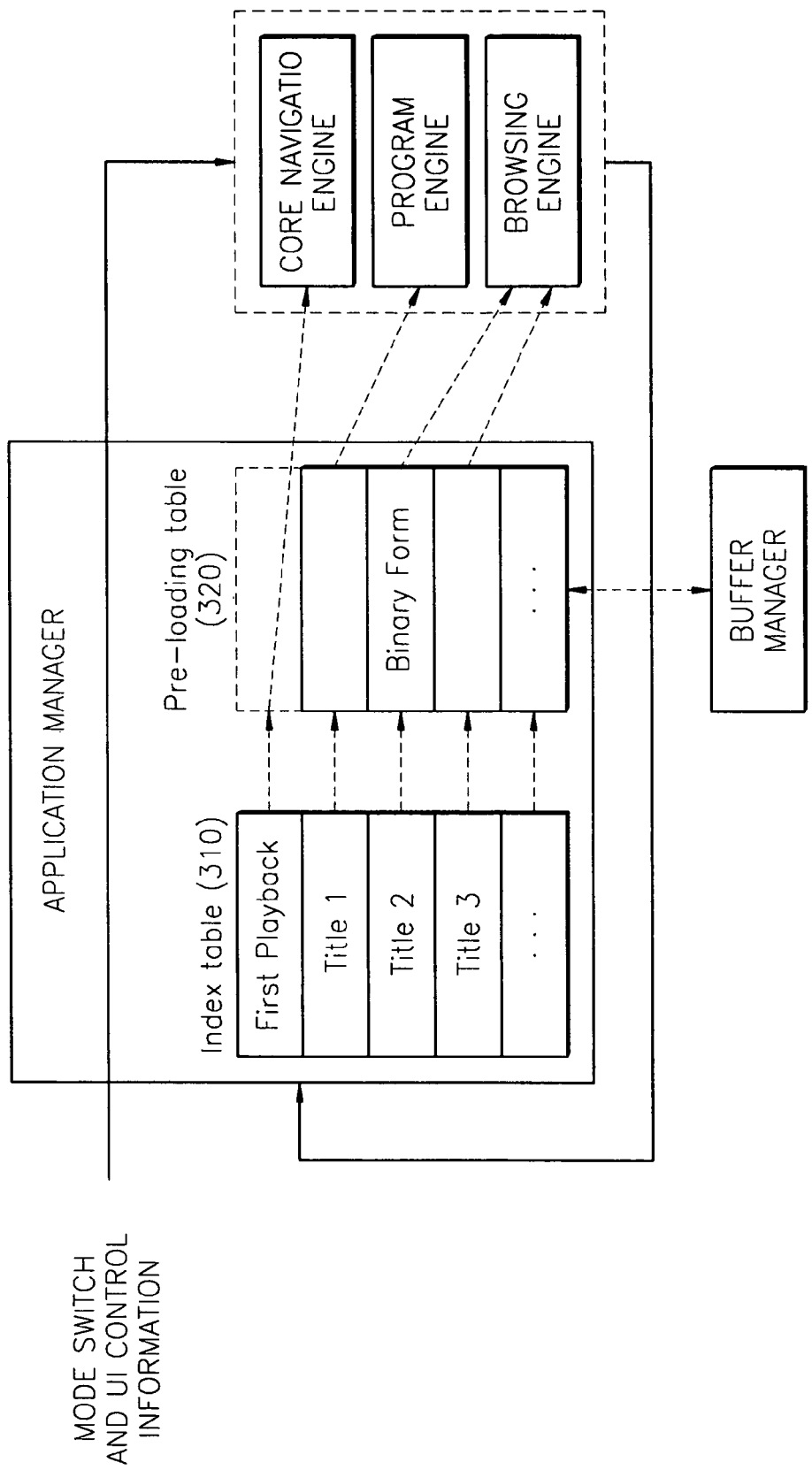
FIG. 3 is a view for explaining a process in which an application manager reproduces core data and full data using system data and preloading data.

FIG. 3 is a view of a process in which the application manager reproduces the core data and data for full using the system data and the preloading data. Referring to FIG. 3, an index table 310 as system data is transferred to the application manager when an information storage medium is first loaded. The application manager decides a mode and data to be first reproduced based on Entry Point of start-up data (First Playback) among the system data. In FIG. 3, since a mode to be first reproduced is a film mode, that is, a core mode, the application manger operates the core navigation engine according to Mode Switching information and reproduces a movie object to be first reproduced based on Entry Point information included in First Playback.

Here, the Mode switching information may be included in advance in the system data. Generally, since reproduction in the core mode is similar to reproduction by a conventional DVD, seemless reproduction of AV data is guaranteed although there is no preloading data. Meanwhile, titles 1, 2 and 3 are reproduced in a program mode and in a browser mode. In a general full mode, related additional information is reproduced along with reproduction of AV data and provided to a user. The additional information may be various resources including various program applications, markup documents, audios, and images.

Therefore, the reader should read various resources as well as read AV data required to be reproduced, from an information storage medium, and accordingly should perform repeated search to detect the locations of the respective data. For this reason, AV data to be decoded and output is disconnected, thereby not guaranteeing seemless reproduction. Therefore, to guarantee seemless reproduction of moving-image data in the full mode, it is preferred to preload various resources used for the corresponding full mode.

Preloading data (Preloading table 320) of FIG. 3 is read with the system data when the information storage medium is first loaded and is managed by the application manager. When Entry Point of a specific title is executed according to the system data, if a corresponding mode is a program mode or a browser mode, the application manager reads various resource information required for reproducing the title for the corresponding mode in the preloading data and transfers the read information to the buffer manager. The buffer manager preloads the received information to the data buffer for program mode or the data buffer for browser mode based on location information of the respective information on the information storage medium, and sends a completion message to the application manger when preloading is complete so that the application manager can begin reproduction.

FIG. 4 shows preloading data syntax according to an aspect of the invention. Referring to FIG. 4, the preloading data includes data location information (e.g., Uniform Resource Indicator: URI), data size information, and data types (for example, image/jpg. Audio/wav, etc.) for data required to be preloaded when First Playback, Top Menu, or a plurality of titles are reproduced. That is, if First Playback, Top Menu, or a specific title should be reproduced according to the index table, the application manager transfers information for resources to be preloaded with reference to the preloading table such as FIG. 4, to the buffer manager. The buffer manager performs preloading based on the received information.

Figure 5:
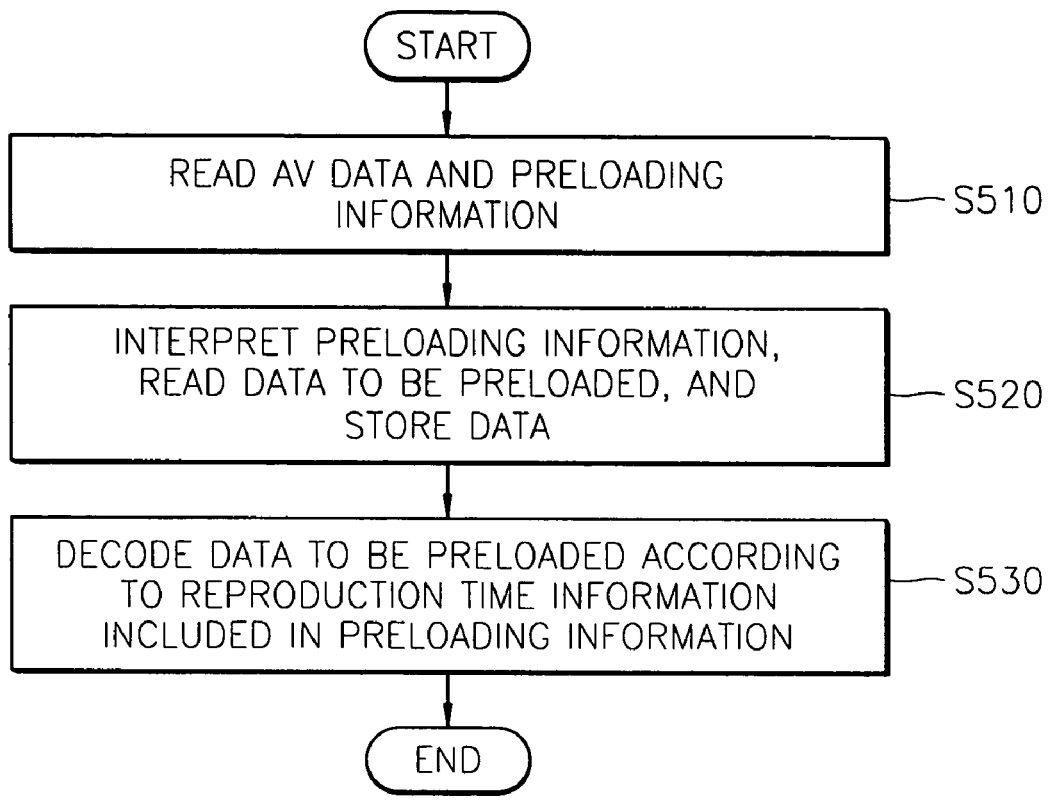
FIG. 5 is a flowchart illustrating a reproduction method according to the present invention.

FIG. 5 is a flowchart illustrating a reproduction method according to an aspect of the invention. Referring to FIG. 5, AV data and preloading information is read in operation 510, the read preloading information is interpreted, object data to be preloaded corresponding to the AV data based on the preloading information is read, and the object data is stored in a buffer in operation 520. Then, after the object data is completely stored in the buffer, preloaded object data is decoded according to reproduction time information included in the preloading information in operation 230.

The invention may also be embodied as a program stored on a computer readable medium to be read by a computer. Here, the computer readable medium includes, but is not limited to, storage media such as magnetic storage media (e.g., ROM's, floppy disks, hard disks, etc.), optically readable media (e.g., CD-ROMs, DVDs, etc.), and carrier waves (e.g., transmission over the Internet). The invention may also be embodied as a computer readable program code unit stored on a computer readable medium to be read by a computer, for causing a number of computer systems connected via a network to affect distributed processing.

As described above, the invention prevents frequent movements of a pickup device and ensures seemless reproduction of AV data, by pre-reading and storing program data and browsing data using preloading information.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A non-transitory computer readable medium encoded with a computer program comprising:
   navigation data;
   audio/video data, that is decoded to an audio/video data stream with reference to the navigation data and is recorded with a format of a clip as a recording and reproducing unit; and
   preload information including instructions that, when executed by a computer, cause the computer to read data to be preloaded corresponding to the audio/video data, and to store the data in a buffer,
   wherein the navigation data comprises instructions that, when executed by the computer, controls reproduction of the audio/video data, and
   wherein the preload information includes location information of the data to be preloaded, the preload information is in a format other than a text format, and the preload information is divided into a plurality of title units, each title unit corresponding to a reproduction mode.

2. The non-transitory computer readable medium encoded with a computer program of claim 1, wherein the preload information further includes size information and/or type information of the data to be preloaded.

3. The non-transitory computer readable medium encoded with a computer program of claim 1, wherein the data to be preloaded includes program data for providing various interactions with a user and browsing data for allowing Internet browsing.

4. An apparatus for reproducing audio/video data recorded in an information storage medium, the apparatus comprising:
   a reader that reads audio/video data and preload information;
   a buffer that stores received audio/video data and/or preload information;
   a decoder that decodes the audio/video data stored in the buffer; and
   a buffer manager that controls the buffer with a reference to the preload information so that preload data is stored in the buffer before the audio/video data is reproduced;
   wherein the preload information stores location information of the data to be preloaded in a format other than a text format, and the preload information is divided into a plurality of title units, each title unit corresponding to a reproduction mode.

5. The apparatus for reproducing audio/video data of claim 4, wherein the preload information further includes size information and/or type information of the data to be preloaded.

6. The apparatus of claim 4, wherein the buffer includes:
   a buffer for audio/video data, that stores the audio/video data; and
   a buffer for system data that stores the preload information.

7. The apparatus for reproducing audio/video data of claim 4, wherein the buffer includes:
   a first buffer that stores browsing data used for Internet browsing;
   a second buffer that stores program data used for interactions with a user; and
   a third buffer for core navigation data that stores core navigation data as a collection of commands for navigating the audio/video data.

8. The apparatus for reproducing audio/video data of claim 4, wherein the decoder includes: an application manager that transfers information for data to be preloaded to the buffer manager, the information is required to be first read with reference to the preload information when contents are reproduced in a specific mode.

9. The apparatus for reproducing audio/video data of claim 8, wherein the buffer manager receives the information for the data to be preloaded, which is required to be first read, from the application manager, transfers a command for starting preloading to the buffer, and sends a completion message to the application manager when the preloading is complete.

10. The apparatus for reproducing audio/video data of claim 9, wherein the information for data to be preloaded is written in a form of an application program interface, the application program interface includes as a parameter a location information of the data.

11. The apparatus for reproducing audio/video data of claim 10, wherein the application program interface is a JAVA application program interface.

12. A method of reproducing audio/video data recorded in an information storage medium, the method comprising:
   reading the audio/video data and/or preload information;
   interpreting the preload information, reading data to be preloaded corresponding to the audio/video data based on the preloading information, and storing the read data in a buffer; and
   decoding the preload data according to reproduction time information included in the preload information,
   wherein the preload information corresponds to a plurality of reproduction modes and includes location information of data to be preloaded in a format other than a text format.

13. The method of reproducing audio/video data of claim 12, wherein the preloading information is written in a form of an application program interface, the application program interface includes the location information of the data to be preloaded as a parameter.

14. The method of reproducing audio/video data of claim 13, wherein the Application Program Interface is a Java application program interface.

15. The method of reproducing audio/video data of claim 12, wherein the preload information further includes size information and/or type information of the data to be preloaded.

16. A non-transitory computer readable medium having embodied thereon a computer program to be read by a computer for executing the method of claim 12.

* * * * *